United States Patent
Maruoka et al.

(10) Patent No.: US 9,855,913 B2
(45) Date of Patent: Jan. 2, 2018

(54) AIRBAG APPARATUS

(71) Applicants: Takata Corporation, Tokyo (JP); Honda Motor Co., Ltd., Tokyo (JP)

(72) Inventors: Mitsuo Maruoka, Tokyo (JP); Masaru Iwazato, Tokyo (JP); Munetoshi Nakashima, Saitama (JP); Kazuaki Miyamoto, Saitama (JP)

(73) Assignees: TAKATA CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/151,637

(22) Filed: May 11, 2016

(65) Prior Publication Data

US 2016/0355156 A1   Dec. 8, 2016

(30) Foreign Application Priority Data

Jun. 5, 2015   (JP) ................. 2015-115145

(51) Int. Cl.
*B60R 21/239* (2006.01)
*B60R 21/276* (2006.01)

(52) U.S. Cl.
CPC .......... *B60R 21/239* (2013.01); *B60R 21/276* (2013.01); *B60R 2021/2765* (2013.01)

(58) Field of Classification Search
CPC ................ B60R 21/239; B60R 21/276; B60R 2021/2765
See application file for complete search history.

(56) References Cited

U.S. PATENT DOCUMENTS

| | | | | |
|---|---|---|---|---|
| 5,249,824 A | * | 10/1993 | Swann | B60R 21/233 280/729 |
| 5,405,166 A | * | 4/1995 | Rogerson | B60R 21/239 280/728.1 |
| 5,501,488 A | * | 3/1996 | Saderholm | B60R 21/233 280/739 |
| 5,913,535 A | * | 6/1999 | Taguchi | B60R 21/233 280/729 |
| 5,927,748 A | * | 7/1999 | O'Driscoll | B60R 21/233 280/729 |
| 6,095,557 A | * | 8/2000 | Takimoto | B60R 21/2338 280/739 |
| 6,206,408 B1 | * | 3/2001 | Schneider | B60R 21/2171 280/728.1 |

(Continued)

FOREIGN PATENT DOCUMENTS

| | | |
|---|---|---|
| JP | 2012-046072 | 3/2012 |
| JP | 2012-166685 | 9/2012 |
| WO | 2009/034752 | 3/2009 |

*Primary Examiner* — Darlene P Condra
(74) *Attorney, Agent, or Firm* — IPUSA, PLLC

(57) ABSTRACT

An airbag apparatus includes airbag having a vent hole formed therein, an inflator configured to emit gas for inflating the airbag, and a chamber configured to accommodate the inflator therein inside the airbag, the chamber having at least one discharge aperture for discharging gas emitted from the inflator to an inside of the airbag, and having a wall part configured to guide the emitted gas to the discharge aperture, wherein an external surface of the wall part is configured to partially cover the vent hole upon collapse of the chamber toward the vent hole.

8 Claims, 8 Drawing Sheets

(56) References Cited

U.S. PATENT DOCUMENTS

| | | | | |
|---|---|---|---|---|
| 6,213,496 B1* | 4/2001 | Minami | ................ | B60R 21/231 |
| | | | | 280/729 |
| 7,232,001 B2* | 6/2007 | Hakki | ................... | B60R 19/205 |
| | | | | 180/271 |
| 7,264,268 B2* | 9/2007 | Ehrke | ................... | B60R 21/233 |
| | | | | 280/729 |
| 7,597,326 B2* | 10/2009 | D'Antonio | .......... | A63F 3/00006 |
| | | | | 273/236 |
| 2005/0087959 A1 | 4/2005 | Heuschmid et al. | | |
| 2008/0073893 A1* | 3/2008 | Schneider | ........... | B60R 21/2338 |
| | | | | 280/740 |
| 2008/0315567 A1* | 12/2008 | Fischer | ................ | B60R 21/233 |
| | | | | 280/732 |
| 2009/0045611 A1* | 2/2009 | Kim | ...................... | B60R 21/239 |
| | | | | 280/730.2 |
| 2009/0283991 A1* | 11/2009 | Honda | .............. | B60R 21/23138 |
| | | | | 280/729 |
| 2012/0068444 A1 | 3/2012 | Suzuki et al. | | |
| 2013/0229004 A1 | 9/2013 | Suzuki et al. | | |
| 2016/0167615 A1* | 6/2016 | Hiruta | ................ | B60R 21/2342 |
| | | | | 280/739 |

\* cited by examiner

FIG.13

|         | d1 | d2 | d3 | d4 | d5 | d6    | d7    |
|---------|----|----|----|----|----|-------|-------|
| a [mm]  | 14 | 24 | 34 | 44 | 54 | 64    | 74    |
| a/b [%] | 23 | 40 | 57 | 73 | 90 | 107   | 123   |
| w/W [%] | 18 | 37 | 58 | 79 | 95 | (100) | (100) |

AIRBAG APPARATUS

BACKGROUND OF THE INVENTION

1. Field of the Invention

The disclosures herein relate to an airbag apparatus.

2. Description of the Related Art

Technology that covers the vent hole of an airbag with a regulating cloth to maintain its internal pressure at a predetermined internal pressure level is known in the art (see Japanese Patent Application Publication No. 2012-46072).

Such a regulating cloth enables the regulation of gas flow exiting through the vent hole, but cannot properly regulate the gas flow of initial emission from the inflator.

Accordingly, there may be a need to provide an airbag apparatus that regulates the gas flow of initial emission from an inflator and that maintains the internal pressure of the airbag.

SUMMARY OF THE INVENTION

It is a general object of the present invention to provide an airbag apparatus that substantially obviates one or more problems caused by the limitations and disadvantages of the related art.

According to an embodiment, an airbag apparatus includes airbag having a vent hole formed therein, an inflator configured to emit gas for inflating the airbag, and a chamber configured to accommodate the inflator therein inside the airbag, the chamber having at least one discharge aperture for discharging gas emitted from the inflator to an inside of the airbag, and having a wall part configured to guide the emitted gas to the discharge aperture, wherein an external surface of the wall part is configured to partially cover the vent hole upon collapse of the chamber toward the vent hole.

According to at least one embodiment, an airbag apparatus is provided that regulates the gas flow of initial emission from an inflator and that maintains the internal pressure of the airbag.

BRIEF DESCRIPTION OF THE DRAWINGS

FIG. 13 is a table illustrating closure ratios of the vent hole; and

DESCRIPTION OF THE PREFERRED EMBODIMENTS

In the following, embodiments of the present invention will be described with reference to the accompanying drawings. In these drawings, the same or corresponding elements are referred to by the same or corresponding numerals, and a description thereof may be omitted as appropriate.

Figure 1:
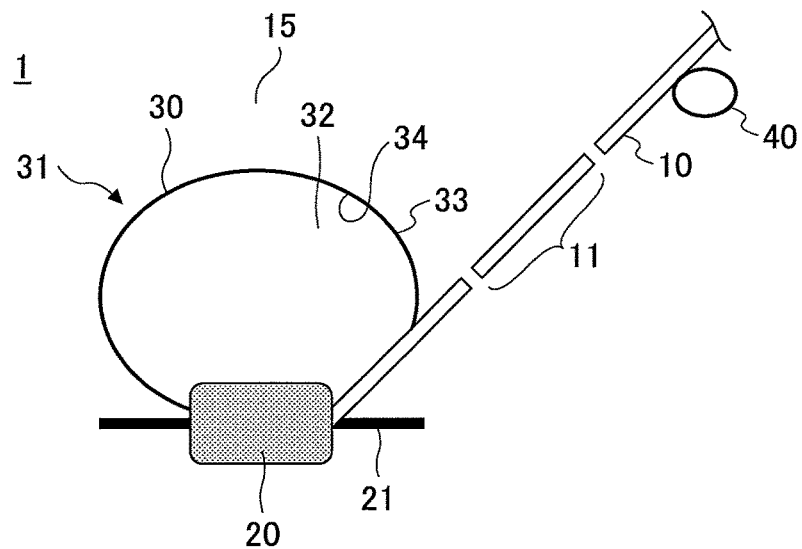
FIG. 1 is a drawing illustrating an example of a chamber behavior at a first point in time.
Figure 2:
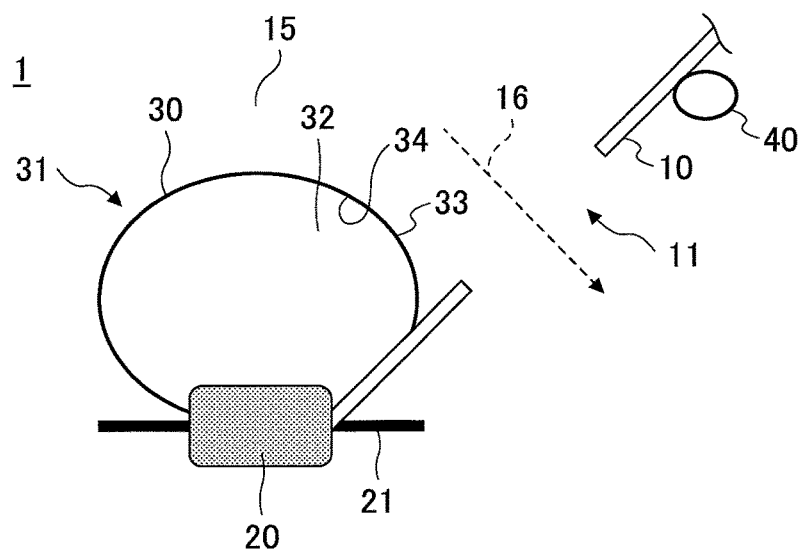
FIG. 2 is a drawing illustrating an example of a chamber behavior at a second point in time.

FIG. 1 is a drawing illustrating an example of the configuration of an airbag apparatus 1. FIG. 1 illustrates a schematic cross-section of part of the airbag apparatus 1. The airbag apparatus 1 is an on-vehicle apparatus that is installed in a vehicle. The airbag apparatus 1 is an example of an occupant restraining apparatus for supporting a vehicle occupant by use of an airbag 10 which is inflated and deployed by the gas emitted from an inflator 20. The airbag apparatus 1 includes the airbag 10, the inflator 20, and a chamber 31, for example.

The airbag 10 may be a fabric member having a bag shape that is inflated and deployed by the gas emitted from the inflator 20. Prior to gas emission from the inflator 20, the airbag 10 is in a folded state and secured to a retainer 21. The retainer 21 is a member fixedly mounted to a vehicle body.

A panel of the airbag 10 has a vent hole 11 through which gas exits from an internal space 15 of the airbag 10. Prior to gas emission from the inflator 20, the vent hole 11 may be in a closed state or in an open state.

Expansion of the airbag 10 at the time of inflation and deployment is regulated by an in-vehicle member 40. The in-vehicle member 40 may be a steering wheel in the case of the airbag 10 for a driver's seat, and may be a front windshield or an instrument panel in the case of the airbag 10 for a passenger's seat.

The inflator 20 is an example of a gas generator configured to emit gas for inflating and deploying the airbag 10. The inflator 20 is secured to the retainer 21 together with the airbag 10. The inflator 20 has a cylindrical member with a plurality of gas outlets formed therein, through which gas is radially emitted.

The chamber 31 may be made of cloth to accommodate the inflator 20 therein inside the airbag 10, and serves as a regulating chamber that regulates the flow of incipient or initial gas emission from the inflator 20. The chamber 31 may sometimes be referred to as a diffuser. Prior to gas emission from the inflator 20, the chamber 31 is in a folded state together with the airbag 10 and secured to the retainer 21.

The chamber 31 has at least one discharge aperture 32 and at least one wall part 30.

The discharge aperture 32 is an opening through which the gas emitted from the inflator 20 is discharged to the inside of the airbag 10. The discharge aperture 32 faces at an angle relative to the surface of the retainer 21 to which the inflator 20 is mounted such that the angle is larger than or equal to 0 degree and smaller than or equal to 90 degrees. Inside the airbag 10, the internal space of the chamber 31 communicates with the external space of the chamber 31 (i.e., the internal space 15 of the airbag 10) through the discharge aperture 32.

The wall part 30 is a panel member that guides the gas emitted from the inflator 20 to the discharge aperture 32. The wall part 30 may be a partition wall that divides the internal space of the chamber 31 from the external space of the chamber 31 (i.e., the internal space 15 of the airbag 10) inside the airbag 10.

The wall part 30 has an internal surface that deflects gas emitted radially from the inflator 20, for example. The directions of the flows of gas emitted radially from the inflator 20 are changed by the internal surface 34. The emitted gas whose flow directions are changed by the internal surface 34 is discharged through the discharge aperture 32 to the internal space 15. This arrangement serves to regulate the flow of incipient gas emission from the inflator 20.

The wall part 30 also has an external surface 33 that is operable to partially cover the vent hole 11 when the chamber 31 falls down or collapses toward the vent hole 11. The chamber 31 collapses toward the vent hole 11 when the amount of gas emitted from the inflator 20 decreases, resulting in the external surface 33 of the wall part 30 partially covering or blocking the vent hole 11. This arrangement serves to maintain the internal pressure of the airbag 10 even when the amount of gas emitted from the inflator 20 starts to decrease.

In the following, a description will be given regarding changes in the state of the chamber 31 and regarding effects provided by the chamber 31 by referring to FIG. 1 through FIG. 5. FIG. 1 through FIG. 4 are drawings illustrating examples of changes of the state of the chamber 31. Schematic cross-sections of part of the airbag apparatus 1 are shown. In each of FIG. 1 through FIG. 4, the discharge aperture 32 faces in a direction perpendicular to the illustrated cross-section of the airbag apparatus 1.

Figure 4:
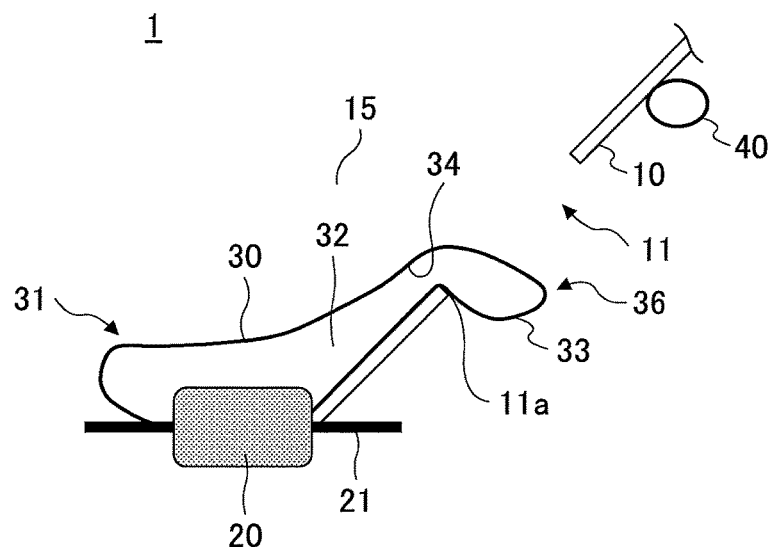
FIG. 4 is a drawing illustrating an example of a chamber behavior at a fourth point in time.
Figure 5:
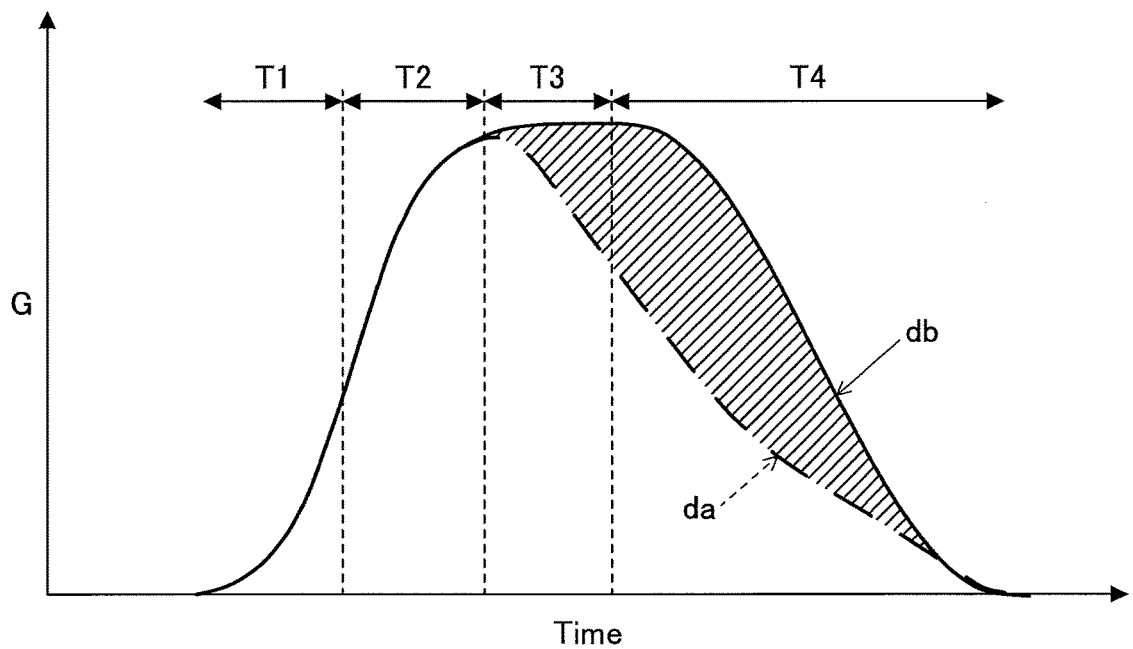
FIG. 5 is a drawing illustrating effects provided by the chamber.

FIG. 5 is a drawing illustrating an example of an effect provided by the chamber 31. FIG. 5 shows an example of temporal changes of impactor acceleration as observed when the airbag 10 hits an impactor. The impactor acceleration is an indicator that can be used to evaluate the value of the internal pressure of the airbag 10. A larger impactor acceleration indicates a higher internal pressure of the airbag 10. The inflated state illustrated in FIG. 1, FIG. 2, FIG. 3, and FIG. 4 correspond to time periods T1, T2, T3, and T4, respectively, shown in FIG. 5.

As inflator 20 starts emitting gas, the internal pressure of the airbag 10 starts to rise (see time period T1 in FIG. 5). Releasing of the gas emitted from the inflator 20 into the internal space of the chamber 31 causes the chamber 31 to be inflated and deployed. In the process of the chamber 31 being inflated and deployed, the emitted gas exits through the discharge aperture 32 and enters the internal space 15, thereby causing the airbag 10 to be also inflated and deployed. In the time period T1, the internal pressure of the airbag 10 is relatively low, so that the vent hole 11 stays in the closed state (see FIG. 1).

During the period in which the amount of gas emitted from the inflator 20 increases, the emitted gas is regulated by the wall part 30 of the chamber 31 in such a manner as to be discharged through the discharge aperture 32, thereby causing an increase in the internal pressure of the airbag (in the time periods T1 and T2). Occurrence of the event that the internal pressure of the airbag 10 exceeds a predetermined level or that a change in the shape of the airbag 10 exceeds a predetermined amount causes the vent hole 11 to open, thereby allowing gas 16 inside the internal space 15 to escape through the vent hole 11 to outside the airbag 10 (see FIG. 2).

A mechanism known in the art may be utilized to open the vent hole 11 upon the occurrence of the event that the internal pressure of the airbag 10 exceeds a predetermined level or that a change in the shape of the airbag 10 exceeds a predetermined amount. Alternatively, the vent hole 11 may be in the open state from the beginning.

Figure 3:
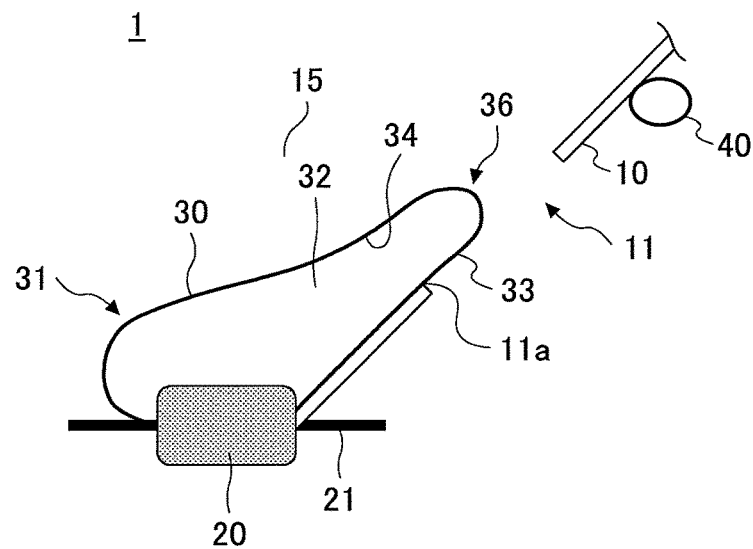
FIG. 3 is a drawing illustrating an example of a chamber behavior at a third point in time.

The chamber 31 then collapses toward the vent hole 11 when the amount of gas emitted from the inflator 20 decreases, resulting in the external surface 33 of the wall part 30 partially covering or blocking the vent hole 11 (see FIG. 3). This serves to regulate the amount of gas 16 exiting through the vent hole 11 from the internal space 15, thereby making it possible to maintain the internal pressure of the airbag 10 even when the amount of gas emitted from the inflator 20 starts to decline.

As the amount of gas emitted from the inflator 20 further decreases or becomes zero, a tip 36 of the external surface 33 extends outwardly to the outside of the airbag 10 from the vent hole 11 (see FIG. 4). The portion of the wall part 30 leading to the tip 36 is bent at an edge 11a of the vent hole 11 due to the gusting force of the gas exiting the airbag 10, and passes through the vent hole 11. The arrangement that the tip 36 extends outwardly from the vent hole 11 serves to avoid excessive reduction in the amount of exhaust from the vent hole 11 despite the fact that the chamber collapsing toward the vent hole 11 causes the external surface 33 of the wall part 30 to partially cover the vent hole 11. An excessive increase in the internal pressure of the airbag 10 can thus be prevented.

As illustrated in the time periods T3 and T4 in FIG. 5, the period during which the internal pressure of the airbag 10 is maintained can be prolonged when the chamber 31 is present (as shown by a waveform db), compared to when the chamber 31 is not present (as shown by a waveform da).

Figure 6:
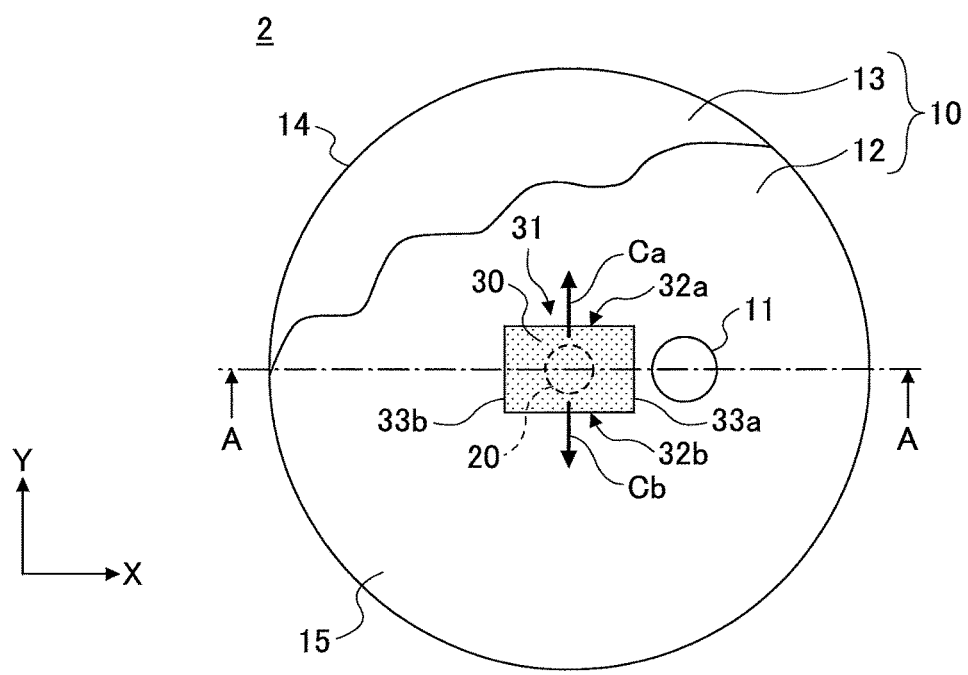
FIG. 6 is a plan view illustrating a schematic example of the configuration of an airbag apparatus.

FIG. 6 is a schematic plan view of an example of the configuration of an airbag apparatus used for a driver's seat, as viewed from the driver's side. In FIG. 6, part of a second panel 13 that is one element of the airbag 10 is not illustrated for the purpose of allowing the internal space 15 of the airbag 10 to be seen. The positive X direction as indicated by the X axis corresponds to the upper side of the vehicle. The Y axis corresponds to the width direction of the vehicle.

The airbag apparatus 2 is a specific example of the airbag apparatus 1 previously described. The descriptions of the airbag apparatus 1 previously provided are incorporated herein with respect to the configuration and effects of the airbag apparatus 2 that are the same as those of the airbag apparatus 1. The same applies in the case of airbag apparatuses 2A, 2B and 2C which will be described later.

The airbag 10 includes a pair of circular panels (i.e., a first panel 12 and a second panel 13). The airbag 10 has a periphery part 14 at which the perimeter of the first panel 12 and the perimeter of the second panel 13 placed one over another are attached together by stitches or the like With the airbag apparatus 2 mounted in the steering wheel of the vehicle, the second panel 13 is situated toward the occupant, and the first panel 12 is situated on the same side as the inflator 20 opposite from the occupant side.

The first panel 12 has the circular vent hole 11 and an opening for installing the inflator 20. The vent hole 11 is situated toward the upper side of the vehicle relative to the center of the first panel 12. The opening for installing the inflator 20 is situated at the center of the first panel 12.

The chamber 31 is formed by curling a band-shaped regulating cloth into a cylindrical form such as to cover the inflator 20. The chamber 31 has a pair of discharge apertures 32a and 32b and the wall part 30. The wall part 30 has a pair of external surfaces 33a and 33b that are opposite portions of the lateral surface of the cylinder. The discharge apertures 32a and 32b are situated at the bases of the cylinder formed by the wall part 30. The discharge aperture 32a is situated between the external surface 33a and the external surface 33b. The discharge aperture 32b is situated between the external surface 33a and the external surface 33b on the opposite side from the discharge aperture 32a.

The discharge apertures 32a and 32b face in the Y-axis direction. The external surfaces 33a and 33b of the wall part 30 are spaced apart from each other in the X-axis direction. With this arrangement, gas emitted from the inflator 20 is not discharged in the X-axis direction, but is discharged in the Y-axis direction. Namely, the chamber 31 discharges emitted gas from the discharge aperture 32a in a discharge direction Ca, and discharges emitted gas from the discharge aperture 32b in a discharge direction Cb.

In the plan view of the airbag apparatus 2, the wall part 30 has the external surface 33a situated between the vent hole 11 and the inflator 20. With this arrangement, the collapsing of the chamber 31 toward the vent hole 11 causes the external surface 33a of the wall part 30 to partially close or cover the vent hole 11.

Figure 7:
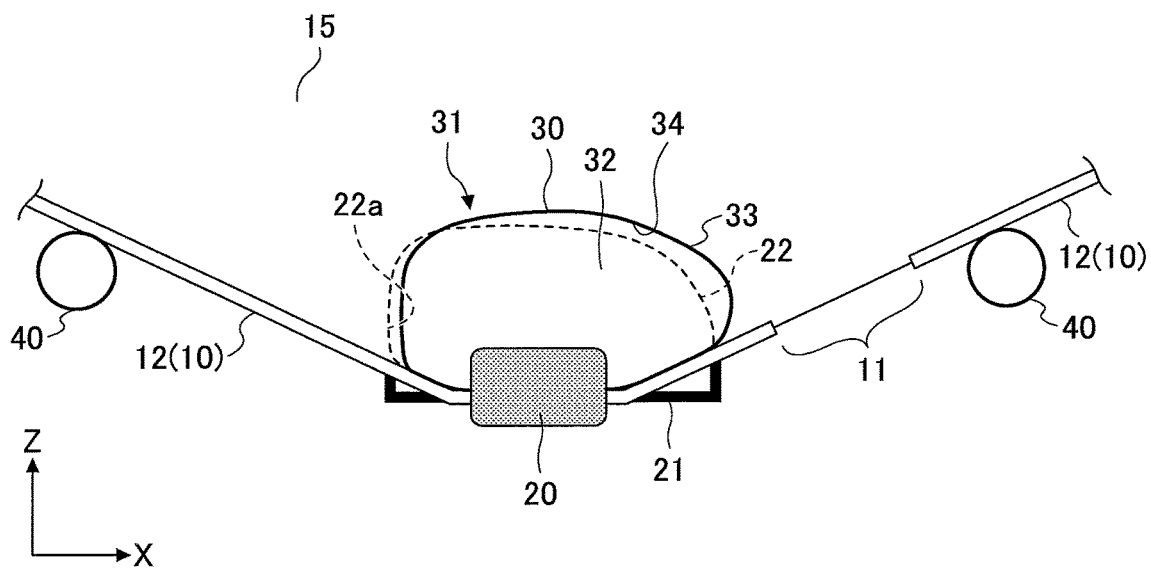
FIG. 7 is a cross-sectional view illustrating the schematic example of the configuration of an airbag apparatus.

FIG. 7 is a drawing illustrating a cross-section of the airbag apparatus 2 taken along a line A-A in FIG. 6. The positive Z direction indicated by the Z axis corresponds to the occupant side. Prior to gas emission from the inflator 20, the airbag 10 and the chamber 31 are in a folded state and secured to the retainer 21. The folded mass of the airbag 10 and the chamber 31 is accommodated in a box-shaped case 22 fixedly attached to the retainer 21.

The case 22 has a case wall 22a situated on the opposite side of the chamber 31 from the vent hole 11, such that the case wall 22a supports the folded mass of the airbag 10 and the chamber 31. The location of the case wall 22a on the opposite side of the chamber 31 from the vent hole 11 facilitates the collapsing of the inflated and deployed chamber 31 toward the vent hole 11 due to stoppage provided by the case wall 22a.

Figure 8:
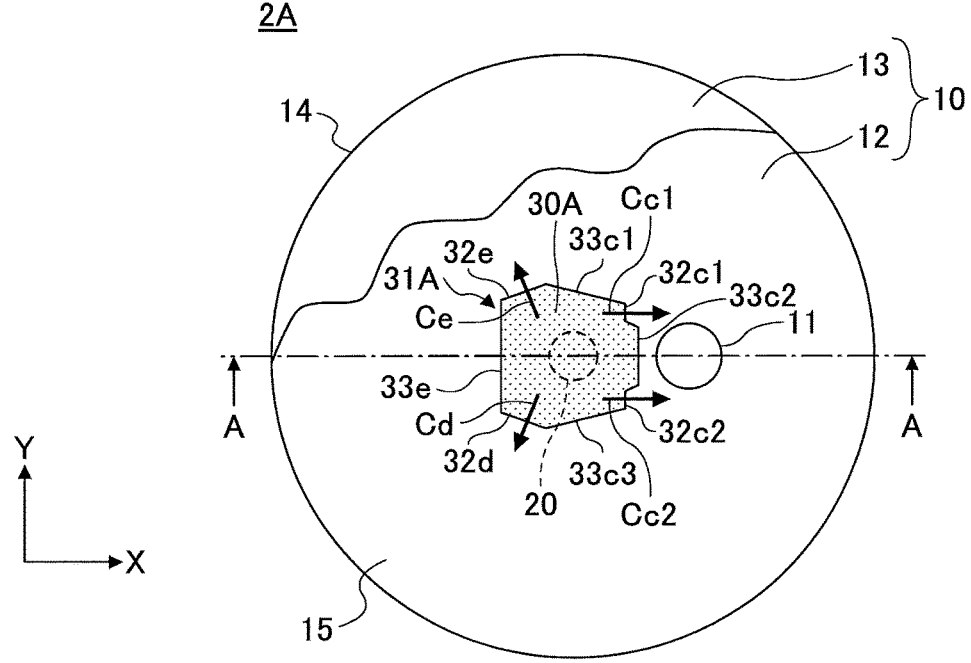
FIG. 8 is a plan view illustrating another schematic example of the configuration of an airbag apparatus.
Figure 9:
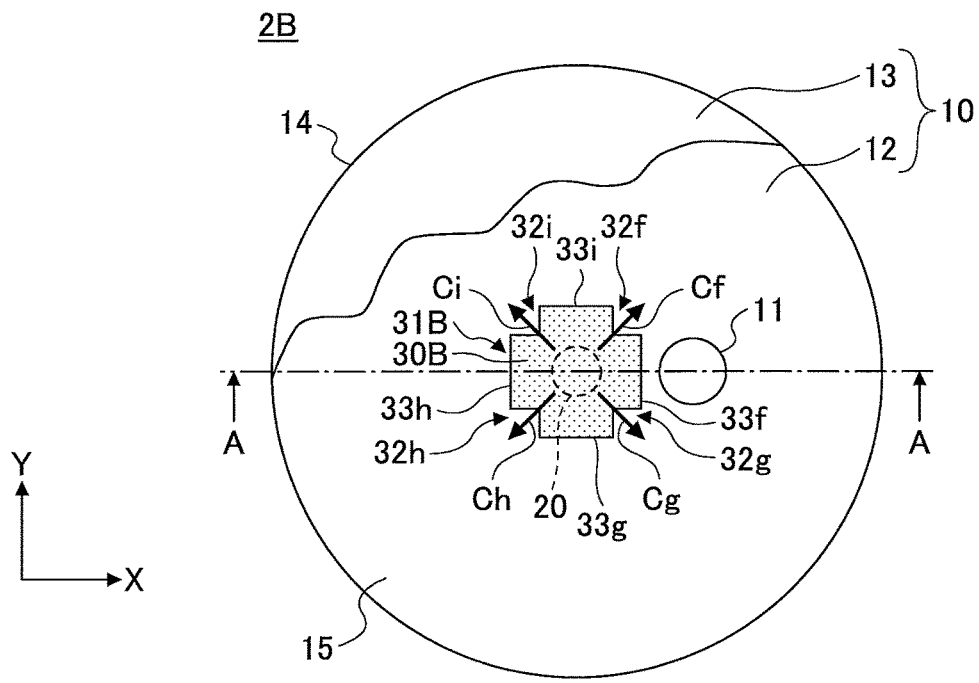
FIG. 9 is a plan view illustrating yet another schematic example of the configuration of an airbag apparatus.
Figure 10:
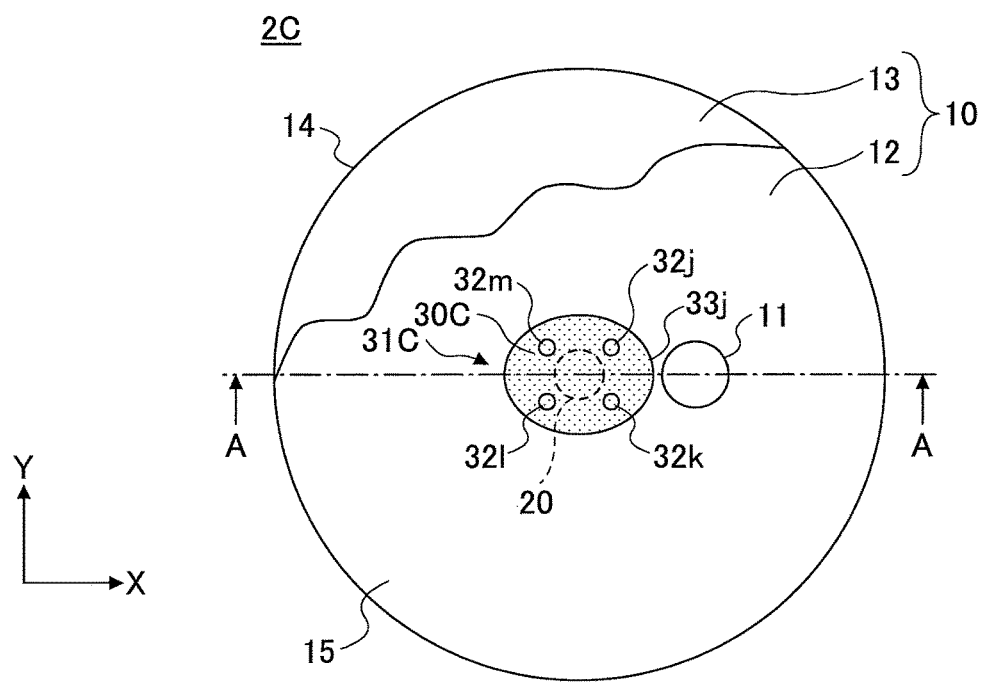
FIG. 10 is a plan view illustrating still another schematic example of the configuration of an airbag apparatus.

The shape of the chamber 31 is not limited to a cylindrical shape. FIG. 8 is a plan view of an airbag apparatus 2A for a driver's seat which has a chamber 31A of a triangular shape (or trapezoid shape) in a plan view. FIG. 9 is a plan view of an airbag apparatus 2B for a driver's seat which has a chamber 31B of a cross shape in a plan view. FIG. 10 is a plan view of an airbag apparatus 2C for a driver's seat which has a chamber 31C of a circular or ellipse shape in a plan view.

In FIG. 8, the chamber 31A has four discharge apertures 32c1, 32c2, 32d and 32e and a wall part 30A. The wall part 30A has four external surfaces 33c1, 33c2, 33c3 and 33e that are situated on the lateral side of the chamber 31A. The four discharge apertures 32c1, 32c2, 32d and 32e are situated on the lateral side of the chamber 31. The discharge aperture 32c1 is situated between the external surface 33c1 and the external surface 33c2. The discharge aperture 32c2 is situated between the external surface 33c2 and the external surface 33c3. The discharge aperture 32d is situated between the external surface 33c3 and the external surface 33e. The discharge aperture 32e is situated between the external surface 33e and the external surface 33c1. The chamber 31A discharges emitted gas from the discharge aperture 32c1 in a discharge direction Cc1, and discharges emitted gas from the discharge aperture 32c2 in a discharge direction Cc2. The chamber 31A also discharges emitted gas from the discharge aperture 32d in a discharge direction Cd, and discharges emitted gas from the discharge aperture 32e in a discharge direction Ce.

In the plan view of the airbag apparatus 2A, the wall part 30A has the external surface 33c2 situated between the vent hole 11 and the inflator 20. With this arrangement, the collapsing of the chamber 31A toward the vent hole 11 causes the external surface 33c2 of the wall part 30A to partially close or cover the vent hole 11.

In FIG. 9, the chamber 31B has four discharge apertures 32f, 32g, 32h and 32i and a wall part 30B. The wall part 30B has four external surfaces 33f, 33g, 33h and 33i situated on the lateral side of the chamber 31B. The four discharge apertures 32f, 32g, 32h and 32i are situated on the lateral side of the chamber 31B. The discharge aperture 32f is situated between the external surface 33i and the external surface 33f. The discharge aperture 32g is situated between the external surface 33f and the external surface 33g. The discharge aperture 32h is situated between the external surface 33g and the external surface 33h. The discharge aperture 32i is situated between the external surface 33h and the external surface 33i. The chamber 31B discharges emitted gas from the discharge aperture 32f in a discharge direction Cf, and discharges emitted gas from the discharge aperture 32g in a discharge direction Cf. The chamber 31B also discharges emitted gas from the discharge aperture 32h in a discharge direction Ch, and discharges emitted gas from the discharge aperture 32i in a discharge direction Ci.

In the plan view of the airbag apparatus 2B, the wall part 30B has the external surface 33f situated between the vent hole 11 and the inflator 20. With this arrangement, the collapsing of the chamber 31B toward the vent hole 11 causes the external surface 33f of the wall part 30B to partially close or cover the vent hole 11.

In FIG. 10, the chamber 31C has four discharge apertures 32j, 32k, 32l and 32m and a wall part 30O. The wall part 30C has an external surface 33j situated on the lateral side of the chamber 310. The four discharge apertures 32j, 32k, 32l and 32m are situated on the upper face of the chamber 31C. The chamber 31C discharges emitted gas through the four discharge apertures 32j, 32k, 32l and 32m.

In the plan view of the airbag apparatus 2C, the wall part 30C has the external surface 33j situated between the vent hole 11 and the inflator 20. With this arrangement, the collapsing of the chamber 31C toward the vent hole 11 causes the external surface 33j of the wall part 30C to partially close or cover the vent hole 11.

In the following, a description will be given with respect to the results of evaluation of the relationship between the closure ratio of the vent hole 11 and the ability to retain the internal pressure of the airbag 10.

Figure 11:
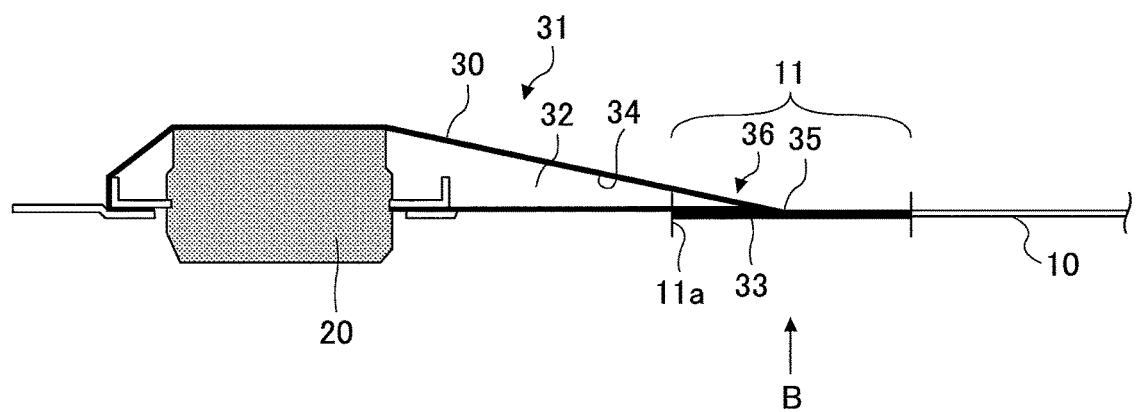
FIG. 11 is a schematic cross-sectional view of an example of the arrangement in which a wall part of the chamber is partially covering a vent hole.
Figure 12:
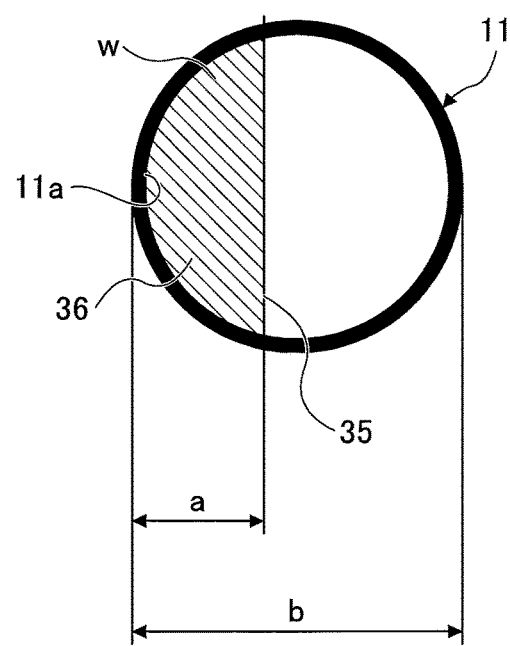
FIG. 12 is a schematic plan view of an example of the arrangement in which the wall part of the chamber is partially covering the vent hole.

FIG. 11 is a schematic cross-sectional view of an example of the wall part 30 of the chamber 31 that is partially covering the vent hole 11. FIG. 12 is a schematic plan view of the vent hole 11 and the wall part of the chamber that is partially covering the vent hole 11, as viewed in a direction B in FIG. 11. An example of the arrangement in which the tip 36 partially covers the vent hole 11 is illustrated in FIG. 11 and FIG. 12.

Figure 14:
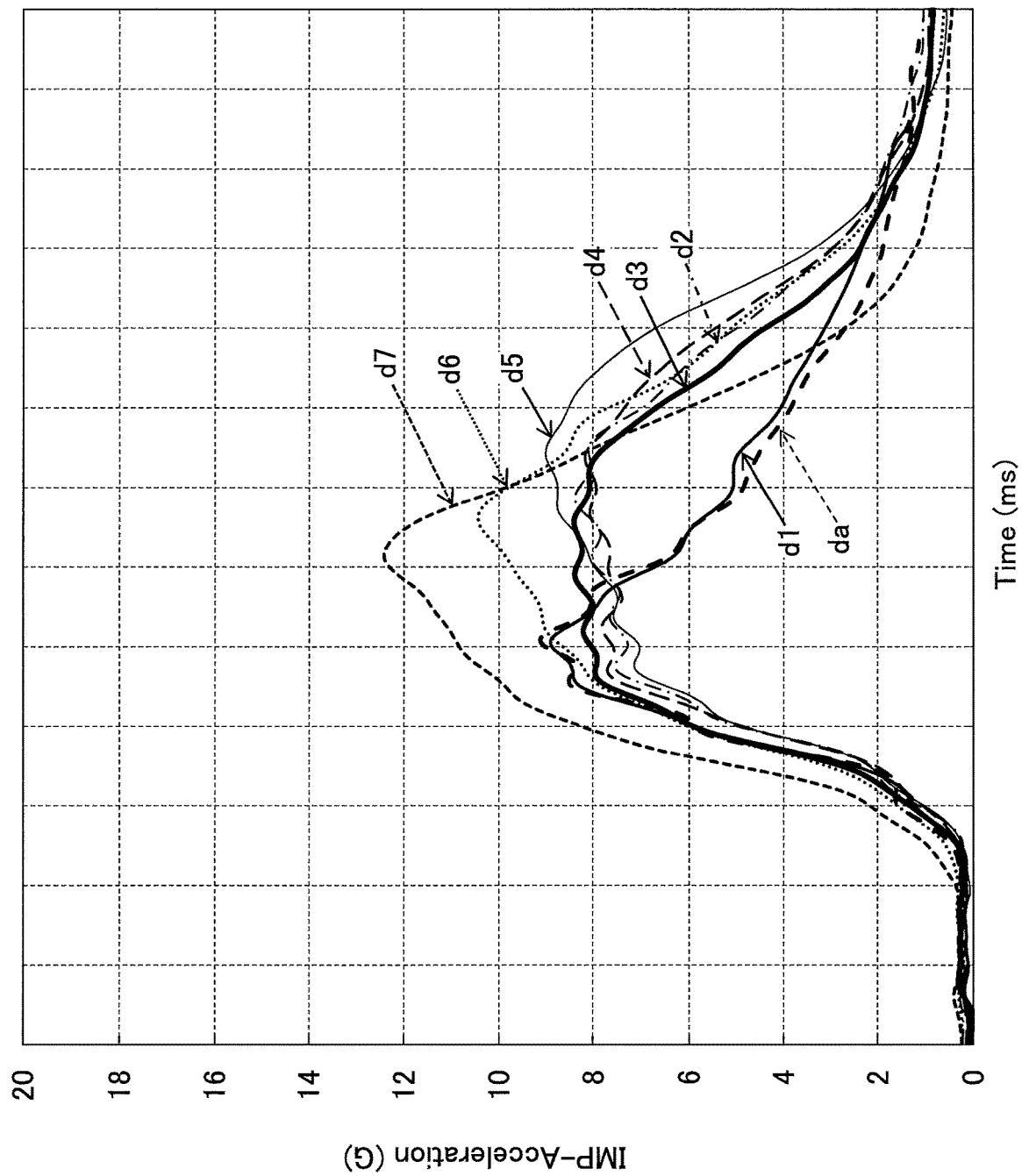
FIG. 14 is a drawing illustrating examples of the effect of different closure rates of the vent hole on the retention of internal pressure.

FIG. 14 is a table illustrating the results of evaluation of the relationship between the closure ratio of the vent hole 11 and the ability to retain the internal pressure of the airbag 10. FIG. 14 shows an example of the results obtained by measuring the changes of impactor acceleration when the airbag 10 hits the impactor while changing the closure ratio of the vent hole 11 as shown in FIG. 13. The vertical axis of FIG. 14 represents impactor acceleration. The impactor acceleration is an indicator that can be used to evaluate the value of the internal pressure of the airbag 10. A larger impactor acceleration indicates a higher internal pressure of the airbag 10.

In FIG. 12 and FIG. 13, "a" indicates the length of coverage of the vent hole 11 in a radial direction of the vent hole 11 when the tip 36 of the wall part 30 provides such a coverage, and "b" indicates the diameter of the vent hole 11. It may be noted that "a" is the distance in a radial direction between an edge 35 of the tip 36 and the edge 11a of the vent hole 11. Further, the area size of the coverage of the vent hole 11 provided by the tip 36 of the wall part 30 is denoted as "w", and the area size of the vent hole 11 is denoted as "W".

As illustrated in FIG. 14, the period during which the internal pressure of the airbag 10 is sustained is prolonged in the case of the closure ratio being d2, d3 and d4, compared to the case of the closure ratio being d1 and the case in which the chamber 31 is nonexistent (shown as "da" in FIG. 14).

In the case of the closure ratio being d2, d3 and d4, the ratio of "a" to "b" is larger than or equal to 40% and smaller than or equal to 73%, and the ratio of "w" to "W" is larger than or equal to 37% and smaller than or equal to 79%. In such a case, the internal pressure of the airbag 10 is suppressed under a predetermined pressure level, and is retained for longer than a predetermined time length as illustrated in FIG. 14.

On the other hand, the case of the ratio of "a" to "b" being smaller than 40% or the ratio of "w" to "W" being smaller than 37% (i.e., the case of the closure ratio being d1 or da) ends up failing to sustain the internal pressure of the airbag 10 for longer than a predetermined time period as illustrated in FIG. 14. Moreover, the case of the ratio of "a" to "b" being larger than 73% or the ratio of "w" to "W" being larger than 79% (i.e., the case of the closure ratio being d5, d6, or d7) ends up failing to suppress the internal pressure of the airbag 10 under a predetermined pressure level as illustrated in FIG. 14.

According to the airbag apparatus of at least one of the disclosed embodiments, a chamber is configured to accommodate an inflator inside an airbag, and has a discharge aperture and a wall part, thereby regulating the flow of incipient gas emission from the inflator. According to at least one embodiment, the chamber collapses toward a vent hole due to a decrease in the amount of emitted gas, thereby causing the external surface of the wall part to partially cover the vent hole to retain the internal pressure of the airbag.

According to a least one embodiment, the external surface may preferably have a tip thereof operable to extend outwardly from the vent hole when the chamber collapses toward the vent hole. The arrangement that the tip extends outwardly from the vent hole serves to avoid excessive reduction in the amount of exhaust from the vent hole despite the fact that the external surface of the wall part partially covers the vent hole, thereby preventing the internal pressure of the airbag from rising excessively.

According to at least one embodiment, the ratio of "a" to "b" is larger than or equal to 40% and smaller than or equal to 73% where "a" is the length of coverage of the vent hole in a radial direction of the vent hole when the wall part provides such coverage, and "b" is the diameter of the vent hole. This arrangement serves to keep the internal pressure of the airbag at a proper level.

According to at least one embodiment, the ratio of "w" to "W" may preferably be larger than or equal to 37% and smaller than or equal to 79% where "w" is the area size of coverage of the vent hole as provided by the wall part, and "W" is the area size of the vent hole. This arrangement serves to keep the internal pressure of the airbag at a proper level.

Although the airbag apparatus has been described by referring to the embodiments, the present invention is not limited to these embodiments. Various modifications and improvements such as combining an embodiment partially or entirely with one or more other embodiments or replacing part of an embodiment with part of another embodiment may be made without departing from the scope of the present invention.

For example, the number of discharge apertures is not limited to one, and may be plural.

The present application is based on Japanese priority application No. 2015-115145 filed on Jun. 5, 2015, with the Japanese Patent Office, the entire contents of which are hereby incorporated by reference.

What is claimed is:

1. An airbag apparatus, comprising:
   an airbag having a vent hole formed therein;
   an inflator configured to emit gas for inflating the airbag; and
   a chamber configured to accommodate the inflator therein inside the airbag, the chamber having at least one discharge aperture for discharging gas emitted from the inflator to an inside of the airbag, and having a wall part configured to guide the emitted gas to the discharge aperture,
   wherein an external surface of the wall part is configured to partially cover the vent hole upon collapse of the chamber toward the vent hole, and
   wherein the chamber has a closed loop shape enclosing the inflator on a cross-section thereof at a position of the inflator.

2. The airbag apparatus as claimed in claim 1, wherein a length of coverage of the vent hole, as provided by the wall part, in a radial direction of the vent hole, is denoted as "a", and a diameter of the vent hole is denoted as "b", and wherein a ratio of "a" to "b" is greater than or equal to 40% and smaller than or equal to 73%.

3. The airbag apparatus as claimed in claim 1, wherein the chamber is made of cloth and configured to be inflated and deployed by the gas emitted from the inflator.

4. The airbag apparatus as claimed in claim 3, wherein the chamber is configured to collapse as the gas emitted from the inflator decreases after incipient gas emission from the inflator.

5. The airbag apparatus as claimed in claim 4, further comprising a wall situated on an opposite side of the inflator from the vent hole and configured to cause the chamber to collapse toward the vent hole.

6. The airbag apparatus as claimed in claim 4, wherein the external surface has a tip thereof configured to extend outwardly from the vent hole to an outside of the airbag due to a force of the emitted gas exiting through the vent hole upon the collapse of the chamber toward the vent hole.

7. An airbag apparatus, comprising:
   an airbag having a vent hole formed therein;
   an inflator configured to emit gas for inflating the airbag; and
   a chamber configured to accommodate the inflator therein inside the airbag, the chamber having at least one discharge aperture for discharging gas emitted from the inflator to an inside of the airbag, and having a wall part configured to guide the emitted gas to the discharge aperture, wherein an external surface of the wall part is configured to partially cover the vent hole upon collapse of the chamber toward the vent hole, and wherein the external surface has a tip thereof configured to extend outwardly from the vent hole upon the collapse of the chamber toward the vent hole.

8. An airbag apparatus, comprising:

an airbag having a vent hole formed therein;

an inflator configured to emit gas for inflating the airbag; and a chamber configured to accommodate the inflator therein inside the airbag, the chamber having at least one discharge aperture for discharging gas emitted from the inflator to an inside of the airbag, and having a wall part configured to guide the emitted gas to the discharge aperture, wherein an external surface of the wall part is configured to partially cover the vent hole upon collapse of the chamber toward the vent hole, and wherein an area size of coverage of the vent hole as provided by the wall part is denoted as "w", and an area size of the vent hole is denoted as "W", and wherein a ratio of "w" to "W" is larger than or equal to 37% and smaller than or equal to 79%.

* * * * *